(12) United States Patent
Koike et al.

(10) Patent No.: US 8,885,939 B2
(45) Date of Patent: Nov. 11, 2014

(54) IMAGE PROCESSING APPARATUS CONFIGURED TO PERFORM IMAGE PROCESSING FOR PLURAL IMAGES AND CONTROL METHOD THEREOF

(75) Inventors: Toru Koike, Tokyo (JP); Eiichi Matsuzaki, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 398 days.

(21) Appl. No.: 13/217,561

(22) Filed: Aug. 25, 2011

(65) Prior Publication Data

US 2012/0050811 A1 Mar. 1, 2012

(30) Foreign Application Priority Data

Aug. 30, 2010 (JP) .................................. 2010-192401
Jun. 1, 2011 (JP) .................................. 2011-123615

(51) Int. Cl.
*G06K 9/34* (2006.01)
*G06K 15/00* (2006.01)
*G09G 5/393* (2006.01)
*G06T 1/60* (2006.01)
*G09G 5/36* (2006.01)

(52) U.S. Cl.
CPC .............. *G06T 1/60* (2013.01); *G09G 2360/06* (2013.01); *G09G 5/393* (2013.01); *G09G 2360/123* (2013.01); *G09G 2360/122* (2013.01); *G09G 5/363* (2013.01)
USPC ......................................... 382/173; 358/1.16

(58) Field of Classification Search
CPC .............. G06T 1/60; G09G 2360/122; G09G 2360/123; G09G 5/363; H04N 1/387
USPC .......................................... 382/173; 358/1.16
See application file for complete search history.

(56) References Cited

U.S. PATENT DOCUMENTS

| 5,617,487 | A  | * | 4/1997  | Yoneyama et al. | ........... 382/199 |
| 6,674,534 | B2 | * | 1/2004  | Norita et al.   | ................... 356/601 |
| 8,107,116 | B2 | * | 1/2012  | Eguchi et al.   | ................ 358/1.16 |
| 8,295,598 | B2 | * | 10/2012 | Inoue et al.    | .................... 382/173 |

FOREIGN PATENT DOCUMENTS

EP      1895470 A2     3/2008

OTHER PUBLICATIONS

Eero Aho et al., "Block-Level Parallel Processing for Scaling Evenly Divisible Images", IEEE Transactions on Circuits and Systems-I: Regular Papers, vol. 52, No. 12, Dec. 2005, p. 2717-2725.

* cited by examiner

*Primary Examiner* — Kanjibhai Patel
(74) *Attorney, Agent, or Firm* — Canon USA Inc. IP Division

(57) ABSTRACT

A writing unit writes first and second divided images on a frame memory. A reading unit adds an end portion included in the second divided image to the first divided image and reads the result as a first read image from the frame memory. Also, the read unit reads the second divided image as a second read image from the frame memory. An image processing unit performs image processing for the first and second read images read from the frame memory. A cutting unit cuts a second sub-end portion from the first read image after the image processing and outputs the result, and cuts a first sub-end portion from the second read image after the image processing and outputs the result.

20 Claims, 12 Drawing Sheets

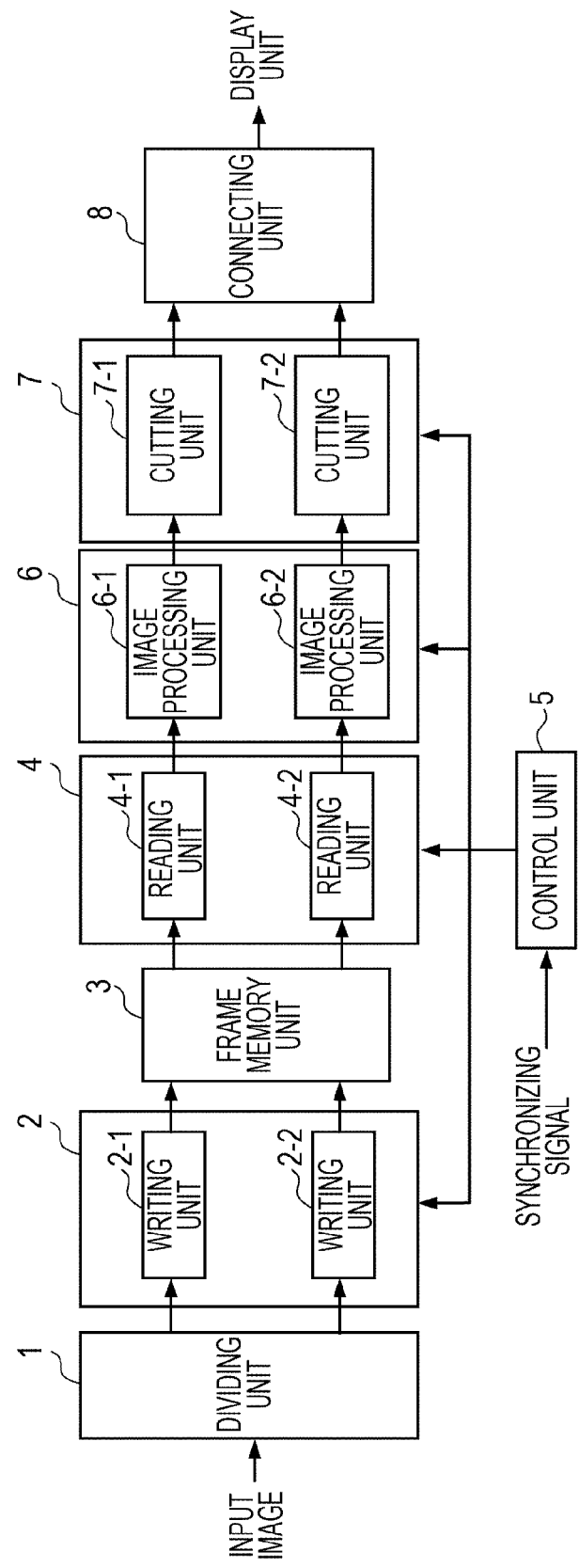

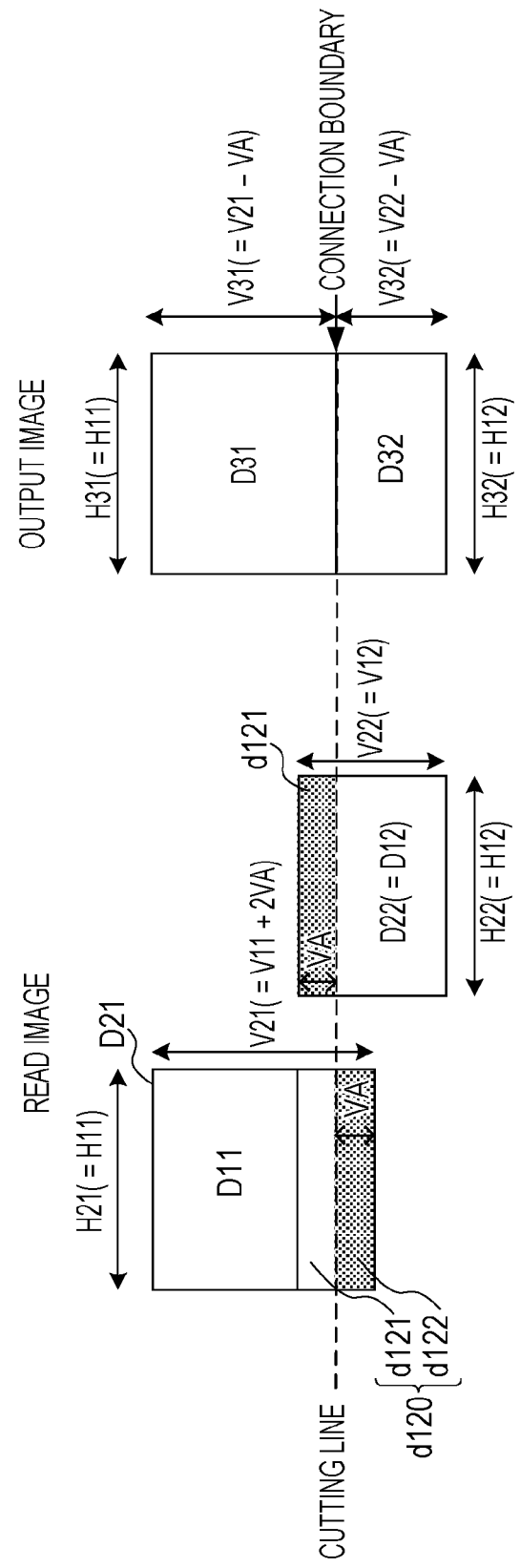

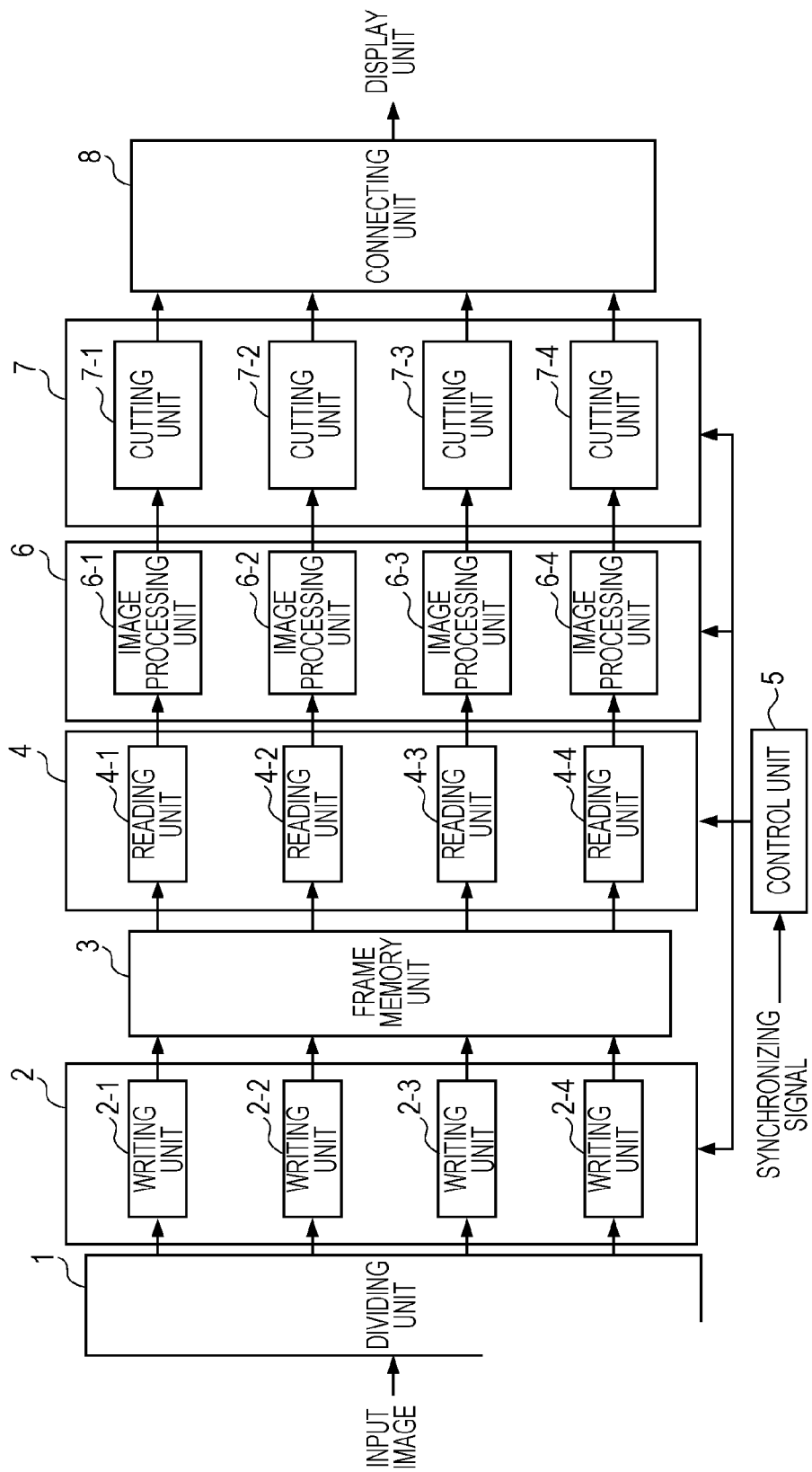

IMAGE PROCESSING APPARATUS CONFIGURED TO PERFORM IMAGE PROCESSING FOR PLURAL IMAGES AND CONTROL METHOD THEREOF

BACKGROUND OF THE INVENTION

1. Field of the Invention

The present invention relates to an image processing apparatus configured to perform image processing for a plurality of images, and a control method of the image processing apparatus.

2. Description of the Related Art

In recent years, an increase in resolution of a display (for example, 4096×2160 pixels) is promoted, and also a movie content with high resolution is created. There has been developed a technique (for example, see Japanese Patent Laid-Open No. 2009-260550) that, if an image processing capacity of a single image processing large scale integration (LSI) is not enough, divides an input image into a plurality of divided images and performs image processing for the plurality of divided images simultaneously by a plurality of image processing LSIs. Also, there has been developed a technique (for example, see Japanese Patent Laid-Open No. 2008-172410 and No. 2000-69293) that, when an input image is divided into a plurality of divided images and image processing is performed, makes connected lines in boundary portions of the plurality of divided images less noticeable.

FIGS. 10A and 10B are illustrations for explaining writing processing and reading processing by an image processing apparatus of related art. An input image is divided into two divided images D11 and D12, and the divided images D11 and D12 are written on a memory. During writing, the divided images D11 and D12 are written on the memory toward a lower side on a horizontal line basis. Since two image processing LSIs perform parallel processing, lines L1, L2, L3 ... of the divided image D11 and lines L1, L2, L3 ... of the divided image D12 can be written simultaneously.

During reading, an end portion d121 of the divided image D12 is added to the divided image D11, and the result is read as a read image D21. The read image D21 is read from the memory toward the lower side on a horizontal line basis. Also, an end portion d111 of the divided image D11 is added to the divided image D12, and the result is read as a read image D22. The read image D22 is read from the memory toward the lower side on a horizontal line basis. Since the two image processing LSIs perform parallel processing, lines L1, L2, L3 ... of the read image D21 and lines L1, L2, L3 ... of the read image D22 can be read simultaneously.

FIG. 11 is an illustration for explaining a writing timing and a reading timing by the image processing apparatus of the related art. The divided images (write images) D11 and D12 are written on the memory in synchronization with a vertical synchronizing signal Vsync1 for writing. In particular, the divided images D11 and D12 are written on the memory on a line basis in response to a synchronizing pulse at a time t11.

The read images D21 and D22 are read from the memory in synchronization with a vertical synchronizing signal Vsync2 for reading. In particular, the read images D21 and D22 are read from the memory on a line basis in response to a synchronizing pulse at a time t51 after writing of the divided images D11 and D12 is completed.

The read images D21 and D22 read from the memory are processed with parallel image processing by the two image processing LSIs, then the added portions d111 and d121 are cut, and the results are connected together. As described above, by adding the end portions d111 and d121, which overlap each other, to the divided images D11 and D12, and reading the results, an output image, which has a less noticeable connected line in a boundary portion between the divided images D11 and D12 and has less deterioration in image quality, can be obtained.

However, in the related art described in FIGS. 10A, 10B, and 11, since the end portion d111 of the divided image D11 is added to the read image D22, the read image D22 cannot be read from the memory only after the entire divided image D11 is written on the memory. Hence, the reading timing of the read images D21 and D22 is delayed relative to the writing timing of the divided images D11 and D12 by about a single field. Owing to this, when image processing is performed for a plurality of divided images, a delay time of image output is increased due to delay of reading.

SUMMARY OF THE INVENTION

The present invention provides an image processing apparatus and a control method of the image processing apparatus that, when image processing is performed for a plurality of images, can reduce unnatural feeling of a boundary portion between the plurality of images and can reduce a delay time of image output.

According to an aspect of the present invention, an image processing apparatus configured to perform image processing for a plurality of images, includes a writing unit configured to write a first divided image and a second divided image that is adjacent to the first divided image in a predetermined direction, on a memory unit in the predetermined direction on a predetermined-number-of-lines basis, the first and second divided images being obtained by dividing an input image; a reading unit configured to add an end portion with a predetermined size that is included in the second divided image and is adjacent to the first divided image, to the first divided image written on the memory unit, read the result as a first read image from the memory unit in the predetermined direction on a predetermined-number-of-lines basis, and read the second divided image written on the memory unit as a second read image from the memory unit in the predetermined direction on a predetermined-number-of-lines basis, the end portion included in the second divided image including a first sub-end portion that is adjacent to the first divided image and a second sub-end portion that is not adjacent to the first divided image; an image processing unit configured to perform image processing for the first and second read images read from the memory unit; and a cutting unit configured to cut the second sub-end portion from the first read image after the image processing and output the result, and cut the first sub-end portion from the second read image after the image processing and output the result.

With the aspect of the present invention, when the image processing is performed for the plurality of images, the unnatural feeling of the boundary portion between the plurality of images can be reduced, and the delay time of the image output can be reduced.

Further features of the present invention will become apparent from the following description of exemplary embodiments with reference to the attached drawings.

BRIEF DESCRIPTION OF THE DRAWINGS

FIG. 1 is a block diagram showing a configuration of an image processing apparatus according to a first embodiment of the present invention.

FIG. 4 is an illustration for explaining the details of operations of a cutting unit and a connecting unit shown in FIG. 1.

FIG. 5 is a block diagram showing a configuration of an image processing apparatus according to a modification of the first embodiment of the present invention.

DESCRIPTION OF THE EMBODIMENTS

First Embodiment

Figure 2A:
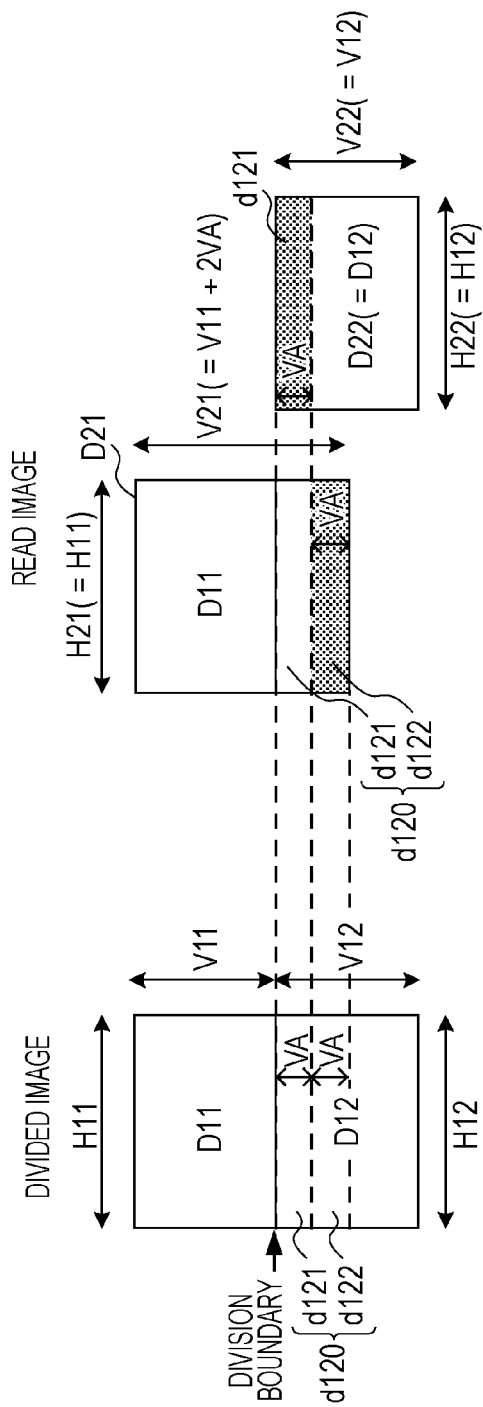
FIG. 2A is a first diagram for explaining the details of operations of a writing unit and a reading unit shown in FIG. 1.

FIG. 1 is a block diagram showing a configuration of an image processing apparatus according to a first embodiment of the present invention. In the first embodiment, an example, in which an input image with high resolution is divided into two images with low resolution and image processing is performed, is described. The image processing apparatus of this embodiment can be applied to, for example, a television broadcasting receiver, a personal computer, a display for medical use, a display for business use, a display for commercial use, and a projector. A display unit may be arranged in the image processing apparatus, or may be externally provided and connected with the image processing apparatus. An image that is input to the image processing apparatus may be a movie or a still image. An image does not have to be input from the outside of the image processing apparatus. For example, an image may be read from, for example, built-in hard disk and reproduced.

The image processing apparatus in FIG. 1 includes a dividing unit 1, a writing unit 2, a frame memory unit 3, a reading unit 4, a control unit 5, an image processing unit 6, a cutting unit 7, and a connecting unit 8. The writing unit 2 includes writing units 2-1 and 2-2, the reading unit 4 includes reading units 4-1 and 4-2, the image processing unit 6 includes image processing units 6-1 and 6-2, and the cutting unit 7 includes cutting units 7-1 and 7-2. The image processing apparatus includes two image processing large scale integrations (LSI). The first image processing LSI includes the writing unit 2-1, the reading unit 4-1, the image processing unit 6-1, and the cutting unit 7-1. The second image processing LSI includes the writing unit 2-2, the reading unit 4-2, the image processing unit 6-2, and the cutting unit 7-2. Alternatively, the dividing unit 1 and the connecting unit 8 do not have to be arranged in the image processing apparatus, and may be provided outside the image processing apparatus. In other words, an image processing module including a plurality of input terminals to which a plurality of divided images are input, the writing unit 2, the frame memory unit 3, the reading unit 4, the control unit 5, the image processing unit 6, and the cutting unit 7 may be arranged in the apparatus. Alternatively, only the dividing unit 11 may be provided outside the image processing apparatus.

The dividing unit 1 divides an input image into two divided images (write images) D11 and D12. The writing unit 2-1 writes the divided image D11 on the frame memory unit 3 in order of raster scanning on a line basis. The writing unit 2-2 writes the divided image D12 on the frame memory unit 3 in order of raster scanning on a line basis. Since the two image processing LSIs perform parallel processing, the divided images D11 and D12 can be written simultaneously.

The frame memory unit 3 temporarily stores the written divided images D11 and D12. The frame memory unit 3 has a region that can store at least two frames of the divided images D11 and D12.

The reading unit 4-1 adds an end portion (region) with a predetermined size included in the divided image D12 to the divided image D11, and reads the result as a read image D21 from the frame memory unit 3 in order of raster scanning on a line basis. The reading unit 4-2 does not add an end portion to the divided image D12, and reads the divided image D12 as a read image D22 from the frame memory unit 3 in order of raster scanning on a line basis. Since the two image processing LSIs perform parallel processing, the read images D21 and D22 can be read simultaneously.

However, writing on the frame memory unit 3 and reading from the frame memory unit 3 do not have to be performed on a line basis. Writing on the frame memory unit 3 and reading from the frame memory unit 3 may be performed on a predetermined-number-of-lines basis (on a block basis, the block having a predetermined size), such as a five-line basis or a ten-line basis.

The control unit 5 controls a writing timing by the writing units 2-1 and 2-2 and a reading timing of the reading units 4-1 and 4-2 with reference to a synchronizing signal of an input image.

The image processing unit 6-1 performs predetermined image processing for the read image D21. The image processing unit 6-2 performs predetermined image processing for the read image D22. The image processing units 6-1 and 6-2 perform image processing, for example, enlargement/reduction processing, edge enhancement processing, and statistic-acquisition processing. The cutting unit 7-1 cuts a margined portion of the read image D21 after the image processing by the image processing unit 6-1, and outputs the result as an image D31 to the connecting unit 8. The cutting unit 7-2 cuts a margined portion of the read image D22 after the image processing by the image processing unit 6-2, and outputs the result as an image D32 to the connecting unit 8. The connecting unit 8 connects the images D31 and D32 together and outputs the result to the display unit. The control unit 5 instructs timings at which the image processing units 6-1 and 6-2 and the cutting units 7-1 and 7-2 are operated. Also, the control unit 5 instructs portions cut by the cutting units 7-1 and 7-2.

In the description of this embodiment, writing, reading, and image processing are performed for an "image." This is assumed to be equivalent to that writing, reading, and image processing are performed for "image data."

Figure 2B:
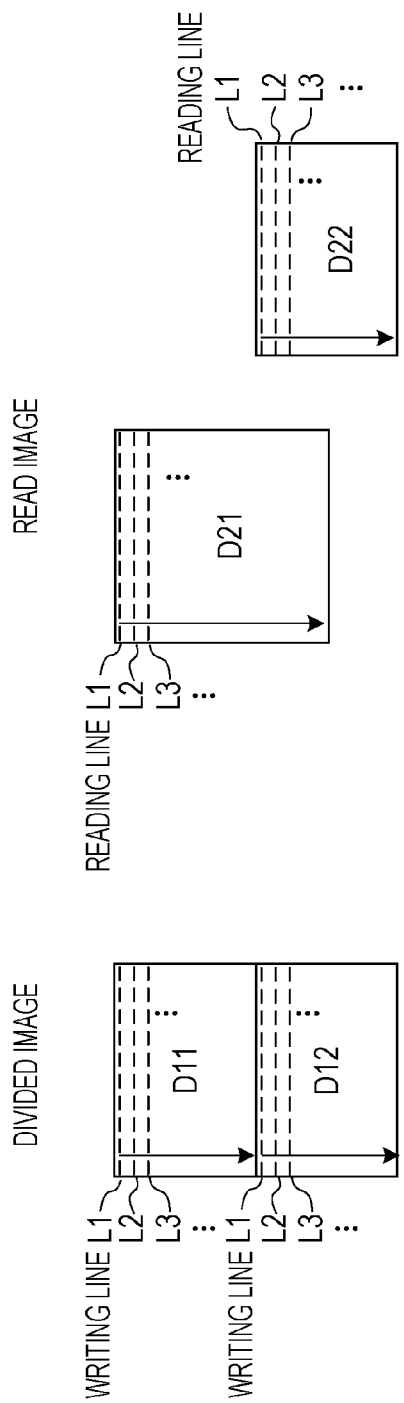
FIG. 2B is a second diagram for explaining the details of operations of the writing unit and the reading unit shown in FIG. 1.

FIGS. 2A and 2B are illustrations for explaining the details of operations of the writing unit 2 and the reading unit 4. The dividing unit 1 divides the input image into the two divided images D11 and D12, and the writing units 2-1 and 2-2 write the divided images D11 and D12 on the frame memory unit 3. The reading units 4-1 and 4-2 read the read images D21 and D22 from the frame memory unit 3. For example, a case in which the input image has a number of horizontal effective pixels of 2048 and a number of vertical effective pixels (=a number of horizontal lines) of 2160 is described. The divided image D11 has a number of horizontal effective pixels H11=2048, and a number of vertical effective pixels (=a number of horizontal lines) V11=1080. The divided image D12 has a number of horizontal effective pixels H12=2048, and a number of vertical effective pixels (=a number of horizontal lines) V12=1080. A lower edge of the divided image D11 and an upper edge of the divided image D12 serve as a division boundary. Alternatively, the divided images D11 and D12 do not have to have the same size, and may have different sizes.

During writing, the divided images (write images) D11 and D12 are written on the frame memory unit 3 toward a lower side on a horizontal line basis. Since two image processing LSIs perform parallel processing, lines L1, L2, L3 . . . of the divided image D11 and lines L1, L2, L3 . . . of the divided image D12 can be written simultaneously.

During reading, an end portion d120 that is included in the divided image D12 and is adjacent to the divided image D11 is added to the divided image D11, and the result is read as the read image D21. The read image D21 is read from the frame memory unit 3 toward the lower side on a horizontal line basis. The divided image D12 is read as the read image D22 without being processed, from the frame memory unit 3 toward the lower side on a horizontal line basis. Since the two image processing LSIs perform parallel processing, lines L1, L2, L3 . . . of the read image D21 and lines L1, L2, L3 . . . of the read image D22 can be read simultaneously.

The read image D21 has a number of horizontal effective pixels H21 (=H11)=2048 and a number of vertical effective pixels V21 (=V11+2VA)=1480. The read image D22 has a number of horizontal effective pixels H22 (=H12)=2048 and a number of vertical effective pixels V22 (=V12)=1080. It is assumed that the end portion d120 of the divided image D12 includes a sub-end portion d121 that is adjacent to the divided image D11 and a sub-end portion d122 that is not adjacent to the divided image D11. Also, it is assumed that the sub-end portions d121 and d122 have a number of vertical effective pixels VA=200. The sub-end portions d121 and d122 are added to make connected lines in a boundary portion of the read images D21 and D22 less noticeable. The size of the sub-end portions d121 and d122 is determined in accordance with the number of taps of a filter that is used for image processing of the image processing units 6-1 and 6-2. For example, the sum of the number of taps of an interpolation filter that is used for the enlargement/reduction processing and the number of taps of a high-pass filter that is used for the edge enhancement processing is the number of vertical effective pixels VA of the sub-end portions d121 and d122. Alternatively, a predetermined value may be added to the sum of the number of taps of that interpolation filter used for the enlargement/reduction processing and the number of taps of the high-pass filter used for the edge enhancement processing to determine the number of vertical effective pixels VA of the sub-end portions d121 and d122. Still alternatively, the number of taps of a filter that is used for processing other than the enlargement/reduction processing and the edge enhancement processing may be added to determine the number of vertical effective pixels of the sub-end portions d121 and d122.

Figure 3A:
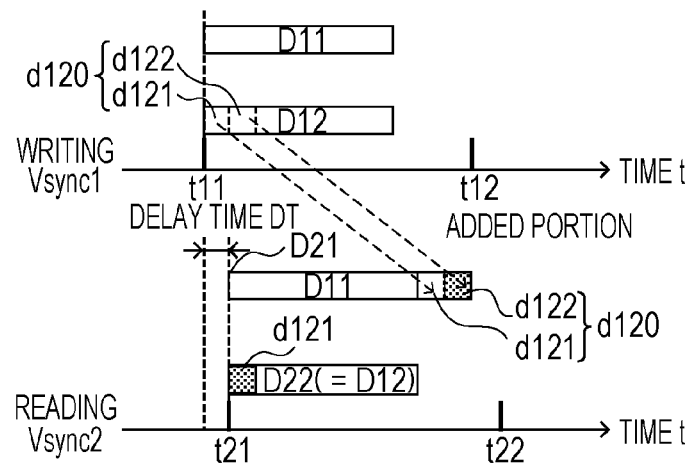
FIG. 3A is a first diagram for explaining a writing timing and a reading timing by the image processing apparatus according to the first embodiment.
Figure 3B:
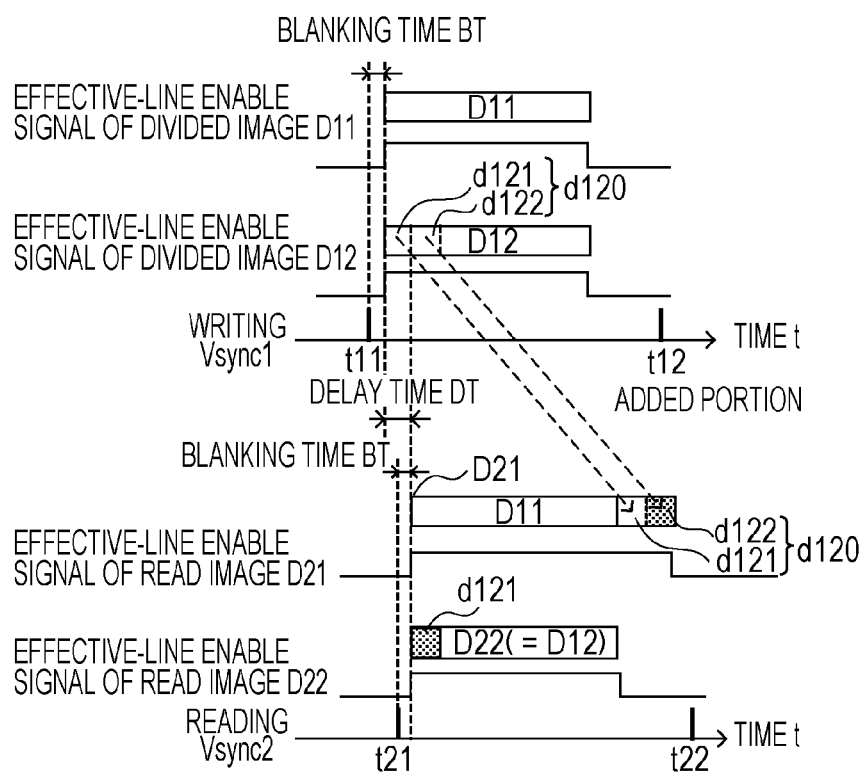
FIG. 3B is a second diagram for explaining the writing timing and the reading timing by the image processing apparatus according to the first embodiment.
Figure 3C:
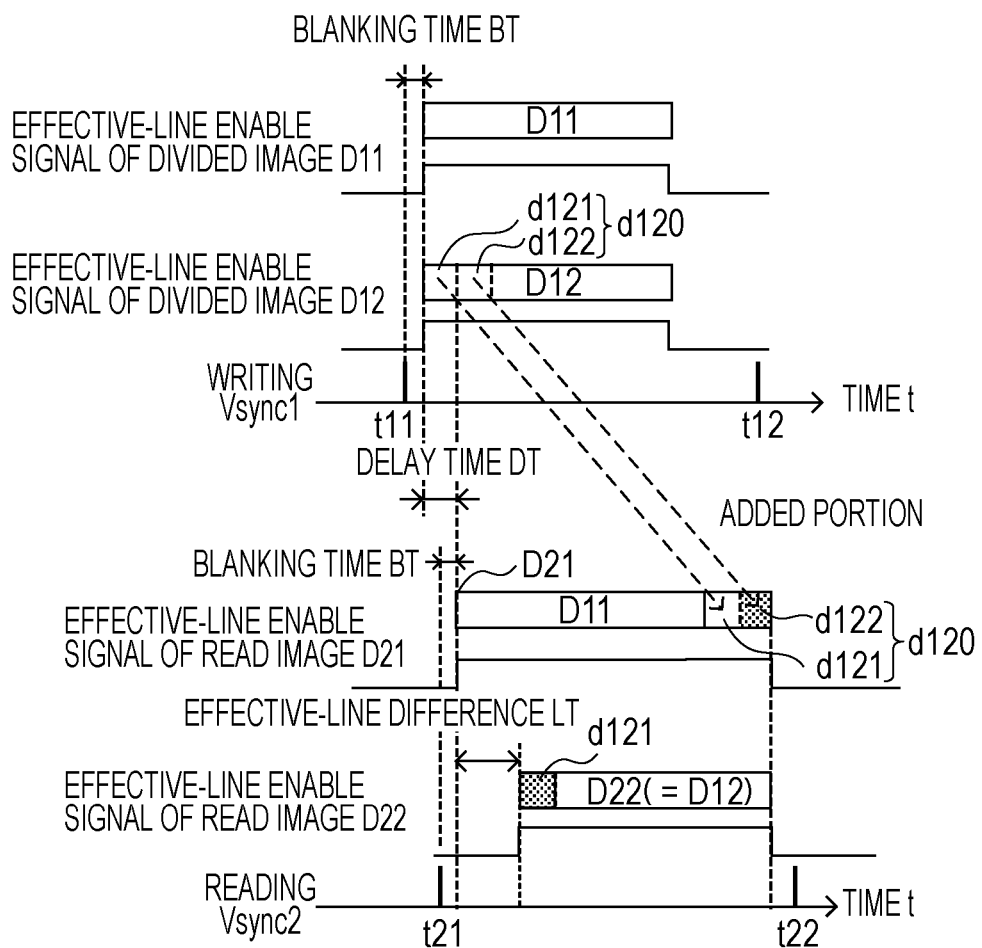
FIG. 3C is a third diagram for explaining the writing timing and the reading timing by the image processing apparatus according to the first embodiment.

FIGS. 3A to 3C each are an illustration for explaining a writing timing and a reading timing by the image processing apparatus according to the first embodiment. There are provided three examples.

In the example shown in FIG. 3A, the divided images (write images) D11 and D12 are written on the frame memory unit 3 in synchronization with a vertical synchronizing signal Vsync1 for writing. In particular, the divided images D11 and D12 are written on the frame memory unit 3 on a line basis in response to a synchronizing pulse of the vertical synchronizing signal Vsync1 at a time t11.

The read images D21 and D22 are read from the frame memory unit 3 in synchronization with a vertical synchronizing signal Vsync2 for reading. In particular, the read images D21 and D22 are read from the frame memory unit 3 on a line basis in response to a synchronizing pulse of the vertical synchronizing signal Vsync2 at a time t21 immediately after writing of the sub-end portion d121 of the divided image D12 is completed. The generation time t21 of the synchronizing pulse of the vertical synchronizing signal Vsync2 for reading is a time obtained such that a time DT required for writing the sub-end portion d121 of the divided image D12 is added to the generation time t11 of the synchronizing pulse of the vertical synchronizing signal Vsync1 for writing.

As described above, the control unit 5 delays the vertical synchronizing signal Vsync2 for reading relative to the vertical synchronizing signal Vsync1 for writing by the time DT required for writing the sub-end portion d121 of the divided image D12. The end portion d120 is added to the divided image D11 and the result is read as the read image D21. Meanwhile, an end portion is not added to the divided image D12 and is read as the read image D22 without being processed. Hence, the delay may be made only by the time DT required for writing the sub-end portion d121 of the divided image D12. The read image D22 can be read as long as writing of the sub-end portion d121 of the divided image D12 has been completed. Hence, the synchronizing pulse of the vertical synchronizing signal Vsync2 for reading may be a timing that is later than the time t21.

In the example shown in FIG. 3B, the control unit 5 controls a writing timing and a reading timing based on an effective-line enable signal. If the divided images D11 and D12 and the read images D21 and D22 each have a vertical blanking time, the writing timing and the reading timing are controlled based on effective-line enable signals.

To be more specific, the effective-line enable signals of the divided images (write images) D11 and D12 rise from a Low level to a High level at a time (t11+BT) obtained such that the vertical blanking time BT is added to the generation time t11 of the synchronizing pulse of the vertical synchronizing signal Vsync1. In response to this, the divided images D11 and D12 are written on the frame memory unit 3 on a line basis.

The read images D21 and D22 are read from the frame memory unit 3 in synchronization with effective-line enable signals of the read images D21 and D22. To be more specific, the effective-line enable signals of the read images D21 and D22 rise from the Low level to the High level at a time (t21+BT) obtained such that the vertical blanking time BT is added to the generation time t21 of the synchronizing pulse of the vertical synchronizing signal Vsync2. In response to this, immediately after writing of the sub-end portion d121 of the divided image D12 is completed, the read images D21 and D22 are read from the frame memory unit 3 on a line basis. The rising time (t21+BT) of the effective-line enable signals of the read images D21 and D22 is a time obtained such that the time DT required for writing the sub-end portion d121 of the divided image D12 is added to the rising time (t11+BT) of the effective-line enable signals of the divided images (write images) D11 and D12. That is, the generation time t21 of the synchronizing pulse of the vertical synchronizing signal Vsync2 for reading is a time obtained such that the time DT required for writing the sub-end portion d121 of the divided image D12 is added to the generation time t11 of the synchronizing pulse of the vertical synchronizing signal Vsync1 for writing.

As described above, the control unit 5 delays the vertical synchronizing signal Vsync2 for reading relative to the vertical synchronizing signal Vsync1 for writing by the time DT required for writing the sub-end portion d121 of the divided image D12. In other words, the effective-line enable signals of the read images D21 and D22 are delayed relative to the effective-line enable signals of the divided images (write images) D11 and D12 only by the time DT required for writing the sub-end portion d121 of the divided image D12. The read image D22 can be read as long as writing of the sub-end portion d121 of the divided image D12 has been completed. Hence, the rising time of the effective-line enable signals of the read images D21 and D22 may be a timing that is later than the time (t21+BT).

FIG. 3C is a modification of the example shown in FIG. 3B. In this modification, a reading end time of the read image D21 corresponds to a reading end time of the read image D22. To be more specific, the effective-line enable signal of the read image D22 rises from the Low level to the High level at a time (t21+BT+LT) obtained such that the vertical blanking time BT and an effective-line difference LT between the read images D21 and D22 are added to the generation time t21 of the synchronizing pulse of the vertical synchronizing signal Vsync2. In response to this, the read image D22 is read from the frame memory unit 3 on a line basis. In this case, the reading end time of the read image D21 corresponds to the reading end time of the read image D22.

Figure 11:
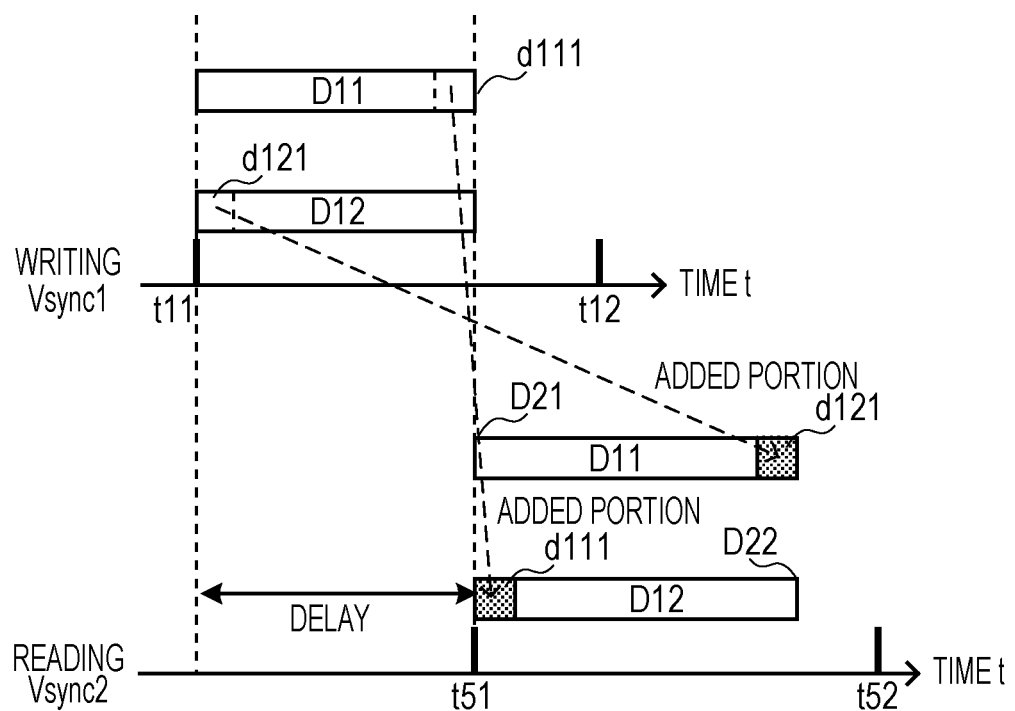
FIG. 11 is an illustration for explaining a writing timing and a reading timing by the image processing apparatus of the related art.

In the related art shown in FIG. 11, the read image D22 cannot be read from the memory only after the entire divided image D11 is written on the memory. Hence, the reading timing of the read images D21 and D22 is delayed relative to the writing timing of the divided images D11 and D12 by about a single field.

In contrast, in the first embodiment, as described with reference to FIGS. 3A to 3C, reading of the read images D21 and D22 can be started even before writing of the divided images D11 and D12 on the frame memory unit 3 is completed as long as writing of the sub-end portion d121 of the divided image D12 on the frame memory unit 3 has been completed. Accordingly, reading of the read images D21 and D22 can be started at a timing earlier than the timing of the related art. This is because the end portion d120 of the divided image D12 is added to the divided image D11 and the result is read as the read image D21, whereas an end portion is not added to the divided image D12 and the divided image D12 is read as the read image D22. Accordingly, reading of the read image D22 can be started before the entire divided image D11 is written.

The image processing units 6-1 and 6-2 perform parallel image processing for the read images D21 and D22 read from the frame memory unit 3. Then, the sub-end portion d122 of the read image D21 and the sub-end portion d121 of the read image D22 are cut, and the results are connected together.

FIG. 4 is an illustration for explaining the details of operations of the cutting unit 7 and the connecting unit 8. The cutting unit 7-1 cuts the sub-end portion d122 including the lower edge of the read image D21, and outputs the result as an image D31. The cutting unit 7-2 cuts the sub-end portion d121 including the upper edge of the read image D22, and outputs the result as an image D32.

The output image D31 from the cutting unit 7-1 has a number of horizontal effective pixels H31 (=H11)=2048, and a number of vertical effective pixels V31 (=V21−VA)=1280. The output image D32 from the cutting unit 7-2 has a number of horizontal effective pixels H32 (=H12)=2048, and a number of vertical effective pixels V32 (=V22−VA)=880. A lower edge of the output image D31 and an upper edge of the output image D32 serve as a connection division boundary. If the image processing unit 6 performs the enlargement/reduction processing, the read image is temporarily stored in a plurality of line memories included in the image processing unit 6, a block of n×n pixels is formed, and interpolation calculation is performed by using a scaling coefficient. Thus, the read images D21 and D22 are enlarged or reduced into the output images D31 and D32 by a predetermined enlargement/reduction ratio.

As described above, the overlapping end portion d120 is added to the divided image D11, the result is read, and the unnecessary sub-end portions d121 and d122 of the read images D21 and D22 are cut. Accordingly, an output image, which has a less noticeable connected line in a boundary portion between the output images D31 and D32 and has less deterioration in image quality, can be obtained.

As described above, with the first embodiment, when the image processing is performed for the plurality of images, the unnatural feeling of the boundary portion between the plurality of images can be reduced, and the delay time of the image output can be reduced. To be more specific, the end portion d120 of the divided image D12 is added to the divided image D11 and the result is read as the read image D21, whereas an end portion is not added to the divided image D12 and the divided image D12 is read as the read image D22. Accordingly, reading of the read image D22 can be started before the entire divided image D11 is written.

Modification of First Embodiment

In the first embodiment, the input image with high resolution is divided into the two divided images with low resolution and the image processing is performed. However, the number of divided images is not limited to two, and may be four, six, eight, etc. In a modification of the first embodiment, an example, in which an input image with high resolution is divided into four images with low resolution and image processing is performed, is described. In this modification of the first embodiment, like reference signs refer like components of the first embodiment, and the details of the components will not be redundantly described.

FIG. 5 is a block diagram showing a configuration of an image processing apparatus according to the modification of the first embodiment of the present invention. A writing unit 2 includes writing units 2-1, 2-2, 2-3, and 2-4, a reading unit 4 includes reading units 4-1, 4-2, 4-3, and 4-4, an image processing unit 6 includes image processing units 6-1, 6-2, 6-3, and 6-4, and a cutting unit 7 includes cutting units 7-1, 7-2, 7-3, and 7-4. The image processing apparatus includes four image processing large scale integrations (LSI). The first image processing LSI includes the writing unit 2-1, the reading unit 4-1, the image processing unit 6-1, and the cutting unit 7-1. The second image processing LSI includes the writing unit 2-2, the reading unit 4-2, the image processing unit 6-2, and the cutting unit 7-2. The third image processing LSI includes the writing unit 2-3, the reading unit 4-3, the image processing unit 6-3, and the cutting unit 7-3. The fourth image processing LSI includes the writing unit 2-4, the reading unit 4-4, the image processing unit 6-4, and the cutting unit 7-4.

A dividing unit 1 divides an input image into four divided images (write images) D11, D12, D13, and D14. The writing unit 2-1 writes the divided image D11 on a frame memory unit 3 in order of raster scanning on a line basis. The writing unit 2-2 writes the divided image D12 on the frame memory unit 3 in order of raster scanning on a line basis. The writing unit 2-3 writes the divided image D13 on the frame memory unit 3 in order of raster scanning on a line basis. The writing unit 2-4 writes the divided image D14 on the frame memory unit 3 in order of raster scanning on a line basis. Since the four image processing LSIs perform parallel processing, the divided images D11, D12, D13, and D14 can be written simultaneously.

The frame memory unit 3 temporarily stores the written divided images D11, D12, D13, and D14. The frame memory unit 3 has a region that can store at least four frames of the divided images D11, D12, D13, and D14.

The reading unit 4-1 adds end portions of the divided images D12 and D13 to the divided image D11, and reads the result as a read image D21 from the frame memory unit 3 in order of raster scanning on a line basis. The reading unit 4-2 adds an end portion of the divided image D14 to the divided image D12, and reads the result as a read image D22 from the frame memory unit 3 in order of raster scanning on a line basis. The reading unit 4-3 adds end portions of the divided images D11 and D14 to the divided image D13, and reads the result as a read image D23 from the frame memory unit 3 in order of raster scanning on a line basis. The reading unit 4-4 adds an end portion of the divided image D12 to the divided image D14, and reads the result as a read image D24 from the frame memory unit 3 in order of raster scanning on a line basis. Since the four image processing LSIs perform parallel processing, the read images D21, D22, D23, and D24 can be read simultaneously.

The control unit 5 controls a writing timing by the writing units 2-1, 2-2, 2-3, and 2-4 and a reading timing of the reading units 4-1, 4-2, 4-3, and 4-4 with reference to a synchronizing signal of an input image.

The image processing unit 6-1 performs predetermined image processing for the read image D21. The image processing unit 6-2 performs predetermined image processing for the read image D22. The image processing unit 6-3 performs predetermined image processing for the read image D23. The image processing unit 6-4 performs predetermined image processing for the read image D24. The image processing units 6-1, 6-2, 6-3, and 6-4 perform image processing, for example, enlargement/reduction processing, edge enhancement processing, and statistic-acquisition processing.

The cutting unit 7-1 cuts a margined portion of the read image D21 after the image processing by the image processing unit 6-1, and outputs the result as an image D31 to the connecting unit 8. The cutting unit 7-2 cuts a margined portion of the read image D22 after the image processing by the image processing unit 6-2, and outputs the result as an image D32 to the connecting unit 8. The cutting unit 7-3 cuts a margined portion of the read image D23 after the image processing by the image processing unit 6-3, and outputs the result as an image D33 to the connecting unit 8. The cutting unit 7-4 cuts a margined portion of the read image D24 after the image processing by the image processing unit 6-4, and outputs the result as an image D34 to the connecting unit 8. The connecting unit 8 connects the images D31, D32, D33, and D34 together and outputs the result to the display unit. The control unit 5 instructs timings at which the image processing units 6-1, 6-2, 6-3, and 6-4 and the cutting units 7-1, 7-2, 7-3, and 7-4 are operated. Also, the control unit 5 instructs portions cut by the cutting units 7-1, 7-2, 7-3, and 7-4.

Figure 6:
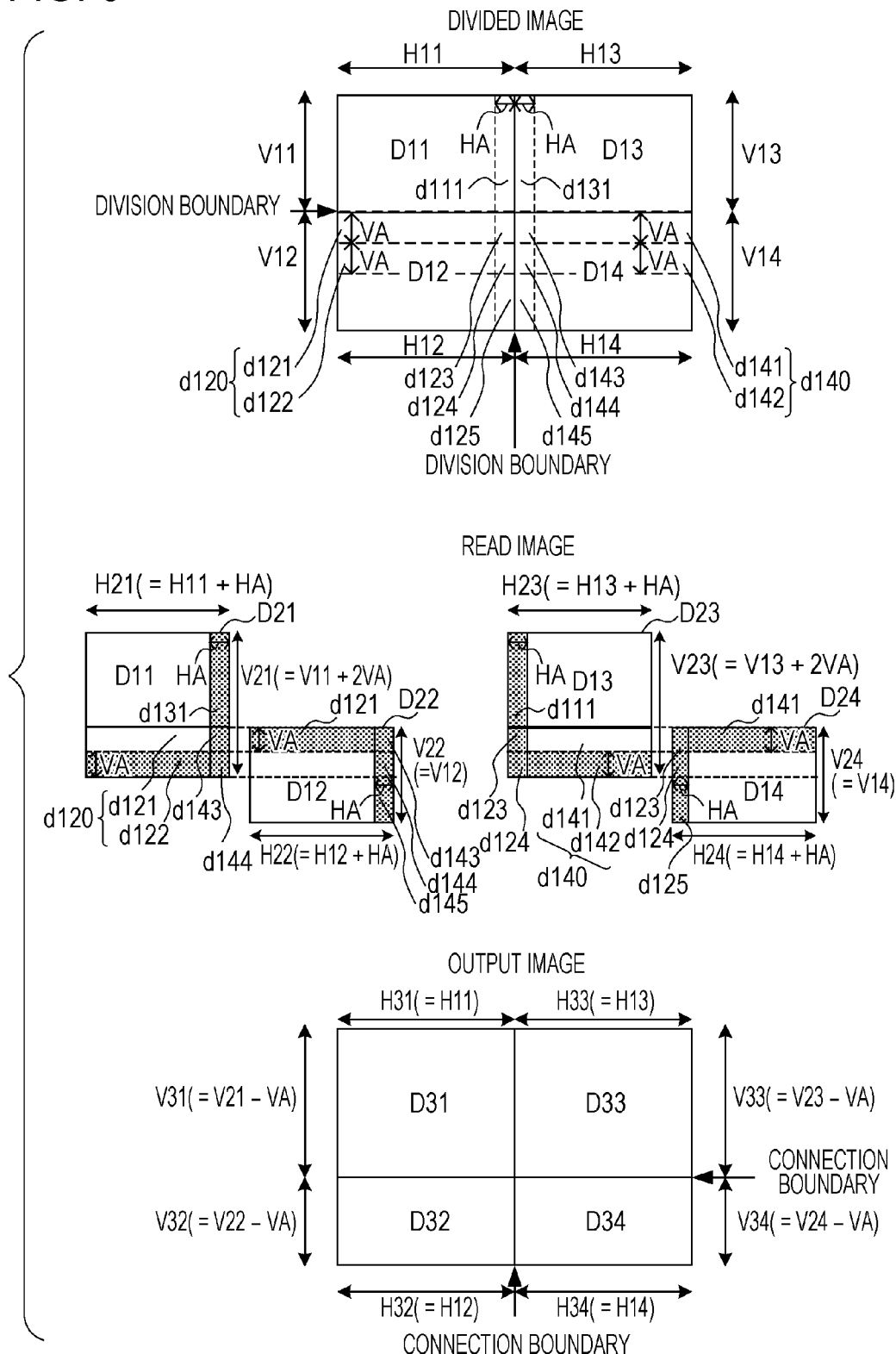
FIG. 6 is an illustration for explaining the details of operations of the writing unit, the reading unit, the cutting unit, and the connecting unit shown in FIG. 5.

FIG. 6 is an illustration for explaining the details of operations of the writing unit 2, the reading unit 4, the cutting unit 7, and the connecting unit 8 according to the modification of the first embodiment of the present invention.

For example, a case in which the input image has a number of horizontal effective pixels of 4096 and a number of vertical effective pixels (=a number of horizontal lines) of 2160 is described. The divided image D11 has a number of horizontal effective pixels H11=2048, and a number of vertical effective pixels (=a number of horizontal lines) V11=1080. The divided image D12 has a number of horizontal effective pixels H12=2048, and a number of vertical effective pixels (=a number of horizontal lines) V12=1080. The divided image D13 has a number of horizontal effective pixels H13=2048, and a number of vertical effective pixels (=a number of horizontal lines) V13=1080. The divided image D14 has a number of horizontal effective pixels H14=2048, and a number of vertical effective pixels (=a number of horizontal lines) V14=1080. Lower edges of the divided images D11 and D13 and upper edges of the divided images D12 and D14 serve as a division boundary in the horizontal direction. Right edges of the divided images D11 and D12 and left edges of the divided images D13 and D14 serve as a division boundary in the vertical direction.

During writing, the divided images (write images) D11, D12, D13, and D14 are written on the frame memory unit 3 toward a lower side on a horizontal line basis. Since four image processing LSIs perform parallel processing, lines L1, L2, L3 . . . of the divided image D11, lines L1, L2, L3 . . . of the divided image D12, lines L1, L2, L3 . . . of the divided image D13, and lines L1, L2, L3 . . . of the divided image D14 can be written simultaneously.

During reading, an end portion d120 of the divided image D12, an end portion d131 that is included in the divided image D13 and is adjacent to the divided image D11, and sub-end portions d143 and d144 that are included in the divided image D14 and are adjacent to the divided image D12 are added to the divided image D11, and the result is read as a read image D21. The read image D21 is read from the frame memory unit 3 toward the lower side on a horizontal line basis. Also, the sub-end portion d143, the sub-end portion d144, and a sub-end portion d145 that are included in the divided image D14 and are adjacent to the divided image D12 are added to the divided image D12, and the result is read as a read image D22 from the frame memory unit 3 toward the lower side on a horizontal line basis. Also, the end portion d140 that is included in the divided image D14 and is adjacent to the divided image D13, an end portion d111 that is included in the divided image D11 and is adjacent to the divided image D13, and sub-end portions d123 and d124 that are included in the divided image D12 and are adjacent to the divided image D14 are added to the divided image D13, and the result is read as a read image D23. The read image D23 is read from the frame memory unit 3 toward the lower side on a horizontal line basis. Also, the sub-end portion d123, the sub-end portion d124, and a sub-end portion d125 that are included in the divided image D12 and are adjacent to the divided image D14 are added to the divided image D14, and the result is read as a read image D24 from the frame memory unit 3 toward the lower side on a horizontal line basis.

Since four image processing LSIs perform parallel processing, lines L1, L2, L3 . . . of the read image D21, lines L1, L2, L3 . . . of the read image D22, lines L1, L2, L3 . . . of the read image D23, and lines L1, L2, L3 . . . of the read image D24 can be read simultaneously.

The read image D21 has a number of horizontal effective pixels H21 (=H11+HA)=2200 and a number of vertical effective pixels V21 (=V11+2VA)=1480. The read image D22 has a number of horizontal effective pixels H22 (=H12+HA) =2200 and a number of vertical effective pixels V22 (=V12) =1080.

It is assumed that the end portion d120 of the divided image D12 includes a sub-end portion d121 that is adjacent to the divided image D11 and a sub-end portion d122 that is not adjacent to the divided image D11. Also, the sub-end portion d121 includes a sub-end portion d123 adjacent to the divided image D14, and the sub-end portion d122 includes a sub-end portion 124 adjacent to the divided image D14. Also, the sub-end portion d125 is adjacent to the divided image D14. It is assumed that the sub-end portions d121, d122, d123, and d124 have a number of vertical effective pixels VA=200. Also, it is assumed that the sub-end portions d123, d124, and d125 have a number of horizontal effective pixels HA=152.

It is assumed that the end portion d140 of the divided image D14 includes a sub-end portion d141 that is adjacent to the divided image D13 and a sub-end portion d142 that is not adjacent to the divided image D13. Also, the sub-end portion d141 includes a sub-end portion 143 adjacent to the divided image D12, and the sub-end portion d142 includes a sub-end portion 144 adjacent to the divided image D12. The sub-end portion d145 is adjacent to the divided image D12. It is assumed that the sub-end portions d141, d142, d143, and d144 have a number of vertical effective pixels VA=200. Also, it is assumed that the sub-end portions d143, d144, and d145 have a number of horizontal effective pixels HA=152.

The sub-end portions d121 and d122 are added to make connected lines in a boundary portion of the read images D21 and D22 less noticeable. The sub-end portions d141 and d142 are added to make connected lines in a boundary portion of the read images D23 and D24 less noticeable. The end portions d111 and d131 are added to make connected lines in a boundary portion of the read images D21 and D23 less noticeable. The sub-end portions d123, d124, d125, d143, d144, and d145 are added to make connected lines in a boundary portion of the read images D22 and D24 less noticeable.

The size of the sub-end portions d121 to d125, and d141 to d145, and the end portions d111 and d131 is determined in accordance with the number of taps of a filter that is used for image processing of the image processing units 6-1, 6-2, 6-3, and 6-4.

The divided images (write images) D11, D12, D13, and D14 are written on the frame memory unit 3 at the same timing in synchronization with a vertical synchronizing signal Vsync1 for writing. The read images D21, D22, D23, and D24 are read from the frame memory unit 3 at the same timing in synchronization with a vertical synchronizing signal Vsync2 for reading. The illustration indicative of a writing timing and a reading timing by the image processing apparatus according to the modification of the first embodiment is similar to any of FIGS. 3A to 3C, and hence is omitted.

The image processing units 6-1, 6-2, 6-3, and 6-4 perform parallel image processing for the read images D21, D22, D23, and D24 read from the frame memory unit 3. Then, margined portions of the read images are cut, and the results are connected together. To be more specific, the cutting unit 7-1 cuts the sub-end portion d122 including the lower edge of the read image D21, as well as the end portion d131 and the sub-end portions d143 and d144 including the right edge of the read image D21, and outputs the image D31. The cutting unit 7-2 cuts the sub-end portion d121 including the upper edge of the read image D22 and the sub-end portions d143, d144, and d145 including the right edge of the read image D22, and outputs the image D32. The cutting unit 7-3 cuts the sub-end portion d142 including the lower edge of the read image D23, as well as the end portion d111 and the sub-end portions d123 and d124 including the left edge of the read image D23, and outputs the image D33. The cutting unit 7-4 cuts the sub-end portion d141 including the upper edge of the read image D24 and the sub-end portions d123, d124, and d125 including the left edge of the read image D24, and outputs the image D34.

The output image D31 from the cutting unit 7-1 has a number of horizontal effective pixels H31 (=H11)=2048, and a number of vertical effective pixels V31 (=V21−VA)=1280. The output image D32 from the cutting unit 7-2 has a number of horizontal effective pixels H32 (=H12)=2048, and a number of vertical effective pixels V32 (=V22−VA)=880. The output image D33 from the cutting unit 7-3 has a number of horizontal effective pixels H33 (=H13)=2048, and a number of vertical effective pixels V33 (=V23−VA)=1280. The output image D34 from the cutting unit 7-4 has a number of horizontal effective pixels H34 (=H14)=2048, and a number of vertical effective pixels V34 (=V24−VA)=880. Lower edges of the output images D31 and D33, and upper edges of the output images D32 and D34 serve as a connection division boundary. Also, right edges of the output images D31 and D32, and left edges of the output images D33 and D34 serve as a connection division boundary.

Hence, even when the image processing is performed for the four divided images, like the first embodiment, the unnatural feeling of the boundary portion between the plurality of images can be reduced, and the delay time of the image output can be reduced.

Second Embodiment

Figure 7:
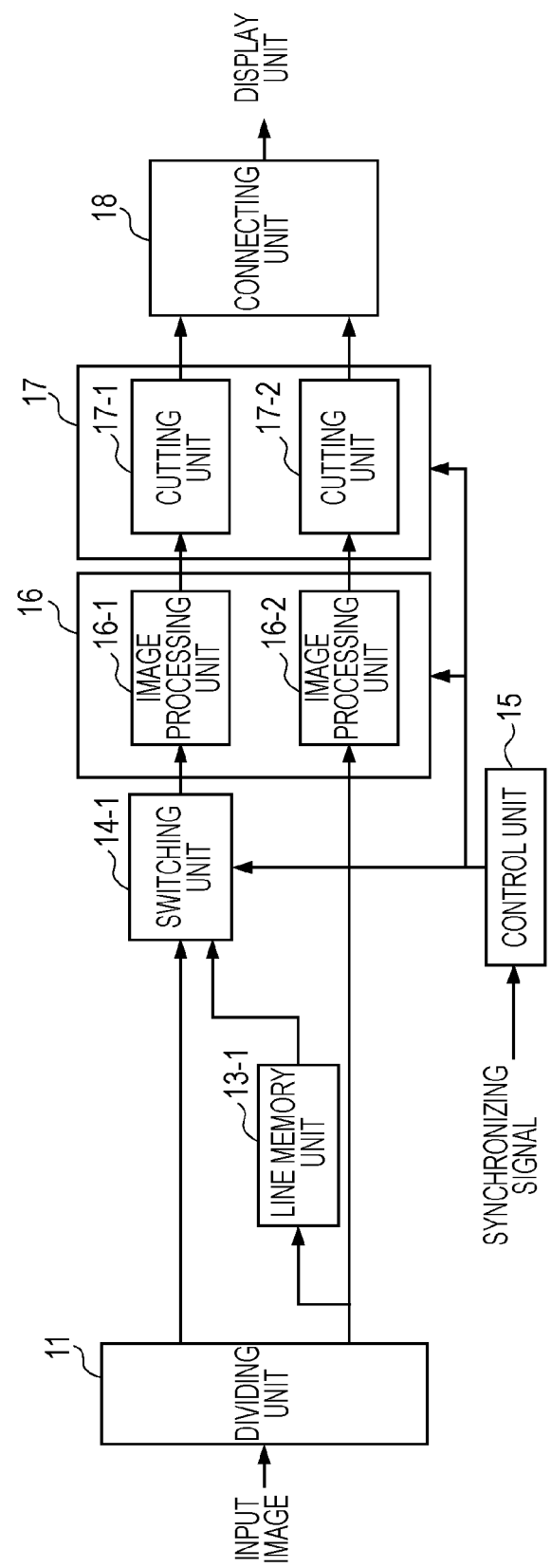
FIG. 7 is a block diagram showing a configuration of an image processing apparatus according to a second embodiment of the present invention.

FIG. 7 is a block diagram showing a configuration of an image processing apparatus according to a second embodiment of the present invention. In the first embodiment, the frame memory unit is used. In the second embodiment, a line memory unit is used. In the second embodiment, the components similar to those in the first embodiment will not be redundantly described. In the description of this embodiment, writing, reading, and image processing are performed for an "image." This is assumed to be equivalent to that writing, reading, and image processing are performed for "image data."

The image processing apparatus in FIG. 7 includes a dividing unit 11, a line memory unit 13-1, a switching unit 14-1, a control unit 15, an image processing unit 16, a cutting unit 17, and a connecting unit 18. The image processing unit 16 includes image processing units 16-1 and 16-2, and the cutting unit 17 includes cutting units 17-1 and 17-2. The image processing apparatus includes two image processing LSIs. The first image processing LSI includes the image processing unit 16-1 and the cutting unit 17-1. The second image processing LSI includes the image processing unit 16-2 and the cutting unit 17-2. Alternatively, the dividing unit 11 and the connecting unit 18 do not have to be arranged in the image processing apparatus, and may be provided outside the image processing apparatus. In other words, an image processing module including a plurality of input terminals to which a plurality of divided images are input, the line memory unit 13-1, the switching unit 14-1, the control unit 15, the image processing unit 16, and the cutting unit 17 may be arranged in the apparatus. Alternatively, only the dividing unit 11 may be provided outside the image processing apparatus.

The dividing unit 11 divides an input image into two divided images D11 and D12. The divided images D11 and D12, and an end portion d120 (sub-end portions d121 and d122) of the divided images are similar to those shown in FIG. 2A.

The line memory unit 13-1 temporarily stores the end portion d120 of the divided image D12 output from the dividing unit 11 in order of raster scanning. The line memory unit 13-1 has a region that can store at least the end portion d120 of the divided image D12.

If the input image has a number of horizontal effective pixels of 2048 and a number of vertical effective pixels (=a number of horizontal lines) of 2160, the divided image D11 has a number of horizontal effective pixels H11=2048, and a number of vertical effective pixels (=a number of horizontal lines) V11=1080. The divided image D12 has a number of horizontal effective pixels H12=2048, and a number of vertical effective pixels (=a number of horizontal lines) V12=1080. It is assumed that the end portion d120 of the divided image D12 includes a sub-end portion d121 that is adjacent to the divided image D11 and a sub-end portion d122 that is not adjacent to the divided image D11. Also, it is assumed that the sub-end portions d121 and d122 have a number of vertical effective pixels VA=200.

The switching unit 14-1 switches the output such that an image D21 in which the end portion d120 of the divided image D12 is added to the divided image D11 is output to the image processing unit 16-1. To be more specific, the output is switched such that a 1st line to a 1080-th line of the divided image D11 from the dividing unit 11 to the image processing unit 16-1 are output and then a 1st line to a 200-th line of the end portion d120 of the divided image D12 is output to the image processing unit 16-1. The divided image D11 and the end portion d120 of the divided image are input from the switching unit 14-1 to the image processing unit 16-1 in order of raster scanning on a line basis. The control unit 15 controls a switching timing by the switching unit 14-1 with reference to a synchronizing signal of the input image.

The divided image D12 output from the dividing unit 11 is input as an image D22 without being processed to the image processing unit 16-2 in order of raster scanning on a line basis.

The image processing unit 16-1 performs predetermined image processing for the image D21 from the switching unit 14-1. The image processing unit 16-2 performs predetermined image processing for the image D22 from the dividing unit 11. The image processing units 16-1 and 16-2 perform image processing, for example, enlargement/reduction processing, edge enhancement processing, and statistic-acquisition processing. The image processing units 16-1 and 16-2 each include a line memory unit for a plurality of lines. Images that are input in order of raster scanning on a line basis are successively written on the line memory unit, are read from the line memory unit on a block basis, the block having a plurality of lines, and treated with image processing. For example, the image processing units 16-1 and 16-2 may each include a line memory unit for at least eight lines.

The cutting unit 17-1 cuts a margined portion of the image D21 after the image processing by the image processing unit 16-1, and outputs the result as an image D31 to the connecting unit 18. The cutting unit 17-2 cuts a margined portion of the image D22 after the image processing by the image processing unit 16-2, and outputs the result as an image D32 to the connecting unit 18. The connecting unit 8 connects the images D31 and D32 together and outputs the result to the display unit. The output from the image processing units 16-1 and 16-2 to the cutting units 17-1 and 17-2, and the output from the cutting units 17-1 and 17-2 to the connecting unit 18 may be made on a line basis or a block basis, the block having a plurality of lines.

The control unit 15 instructs timings at which the image processing units 16-1 and 16-2 and the cutting units 17-1 and 17-2 are operated. Also, the control unit 15 instructs portions cut by the cutting units 17-1 and 17-2.

In the second embodiment, the line memory unit is used instead of the frame memory unit. Accordingly, advantages similar to those in the first embodiment can be obtained with a further inexpensive configuration.

Modification of Second Embodiment

Figure 8:
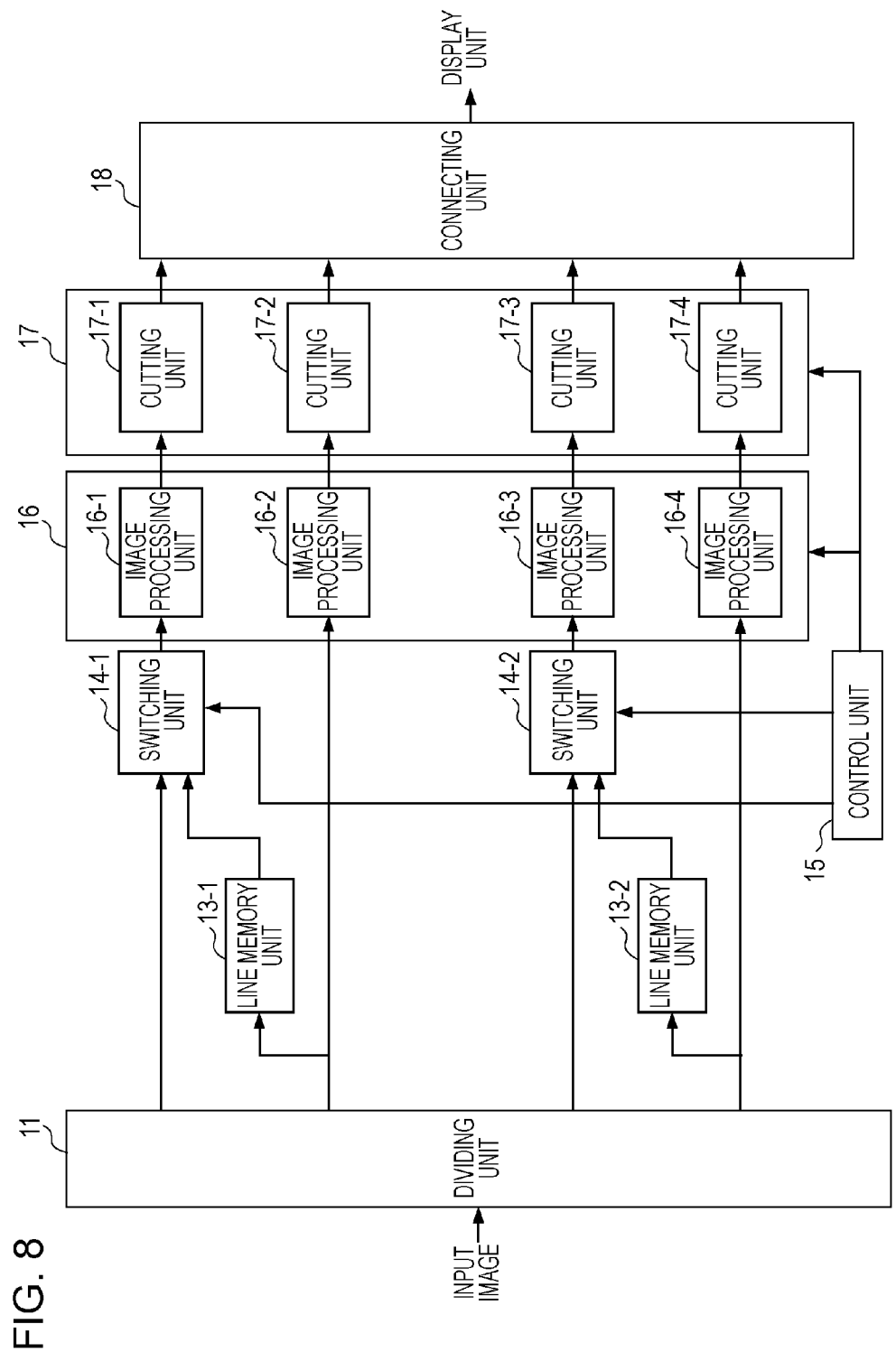
FIG. 8 is a block diagram showing a configuration of an image processing apparatus according to a modification of the second embodiment of the present invention.

In the second embodiment, the input image with high resolution is divided into the two divided images with low resolution and the image processing is performed. However, the number of divided images is not limited to two, and may be four, six, eight, etc. For example, FIG. 8 shows a configuration in which an input image with high resolution is divided into four divided images with low resolution and image processing is performed. FIG. 8 shows a configuration that further includes a line memory unit 13-2, a switching unit 14-2, image processing units 16-3 and 16-4, and cutting units 17-3 and 17-4 in addition to the configuration shown in FIG. 7.

End portions and sub-end portions that are added to divided images D11, D12, D13, and D14 are similar to those shown in FIG. 6. The switching unit 14-1 switches the output such that an image D21 in which an end portion d120 of the divided image D12 is added to the divided image D11 is output to the image processing unit 16-1. Also, the switching unit 14-2 switches the output such that an image D23 in which the end portion d140 of the divided image D14 is added to the divided image D13 is output to the image processing unit 16-3. The control unit 15 controls switching timings by the switching units 14-1 and 14-2 with reference to a synchronizing signal of the input image. The divided image D12 output from the dividing unit 11 is input as an image D22 without being processed to the image processing unit 16-2 in order of raster scanning on a line basis. Also, the divided image D14 output from the dividing unit 11 is input as an image D24 without being processed to the image processing unit 16-4 in order of raster scanning on a line basis. The image processing units 16-1, 16-2, 16-3, and 16-4 perform predetermined image processing for the images D21, D22, D23, and D24 shown in FIG. 6. The cutting units 17-1, 17-2, 17-3, and 17-4 cut margined portions and output images D31, D32, D33, and D34 to the connecting unit 18.

As described above, even when the image processing is performed for the four divided images, by using the line memory units instead of the frame memory units, advantages similar to those of the first embodiment can be obtained with a further inexpensive configuration.

Third Embodiment

In the above-described embodiments, the input image is divided into the plurality of divided images. In the present invention, however, the input image does not have to be divided into the plurality of divided images. In particular, the dividing unit in FIGS. 1, 5, and 7 may not be provided. Without the processing of dividing the input image, a line corresponding to divided images may be determined as a boundary, and line numbers for writing may be changed.

When the dividing unit 1 in FIG. 1 is not provided, the same input image is input into the writing units 2-1 and 2-2. In this case, the writing unit 2-1 writes lines of the input image from a p-th line to a q-th line (where q>p) as a write image D11, on the frame memory unit 3 on a predetermined-number-of-lines basis, and writes lines from a (q+1)-th line to a r-th line (where r>(q+1)) as a write image D12, on the frame memory unit 3 on a predetermined-number-of-lines basis.

If the input image has a number of horizontal effective pixels of 2048 and a number of vertical effective pixels (=a number of horizontal lines) of 2160, for example, it is assumed that p=1, q=1080, and r=2160. In this case, the write image D11 has a number of horizontal effective pixels H11=2048, and a number of vertical effective pixels (=a number of horizontal lines) V11=1080. The write image D12 has a number of horizontal effective pixels H12=2048, and a number of vertical effective pixels (=a number of horizontal lines) V12=1080. A lower edge of the write image D11 and an upper edge of the write image D12 serve as a write division boundary. The values of p, q, and r are merely examples. The value p may be larger than 1, the value q may be larger or smaller than 1080, and the value r may be smaller than 2160.

The reading unit 4-1 adds an end portion d120 with a predetermined size from a 1st line to a z-th line (where 1<z) included in the write image D12 to the write image D11 written on the frame memory unit 3, and reads the result as a read image D21 from the frame memory unit 3 on a predetermined-number-of-lines basis. The reading unit 4-2 reads the write image D12 written on the frame memory unit 3 as a read unit D21 without being processed from the frame memory unit 3 on a predetermined-number-of-lines basis.

With this third embodiment, advantages similar to those in the first embodiment can be obtained with a further simple configuration without the dividing unit. It is to be noted that, like the description for the modification of the first embodiment, the number of write images and the number of read images are not limited to two, and may be four, six, eight, etc.

The input image is not limited to a video signal input, and may be, for example, input data in an image file form. The input image file is written on the frame memory unit 3 by using a CPU, a DMA, or the like. The reading unit 4-1 reads the read image D21, and the reading unit 4-2 reads the read image D22. Even when the input is the image file, advantages similar to those of the third embodiment can be obtained.

Fourth Embodiment

In the above-described embodiments, the end portion is added during reading. However, the end portion may be added during writing. In this case, the write image is equivalent to the read image.

Figure 9:
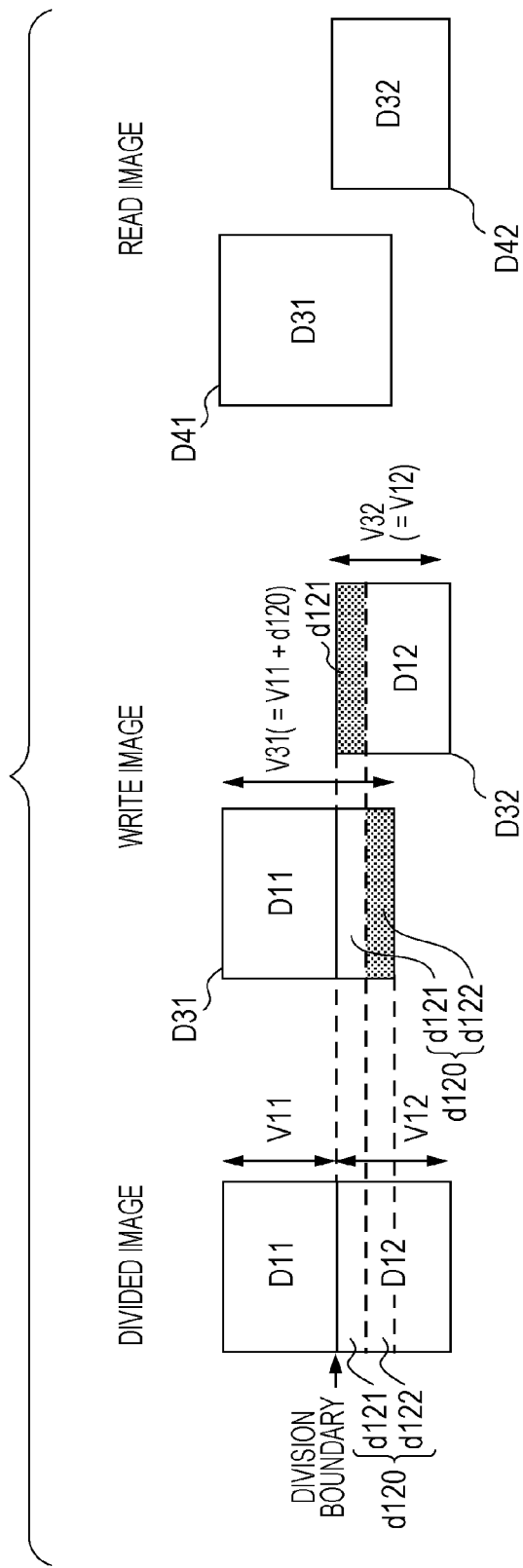
FIG. 9 is an illustration for explaining operations of a writing unit and a reading unit according to a fourth embodiment of the present invention.
Figure 10A:
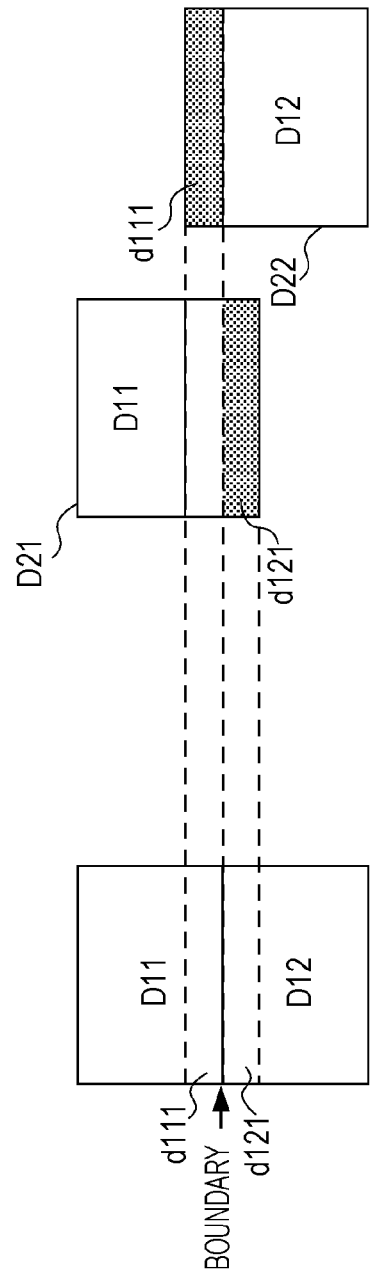
FIG. 10A is a first diagram for explaining writing processing and reading processing by an image processing apparatus of related art.
Figure 10B:
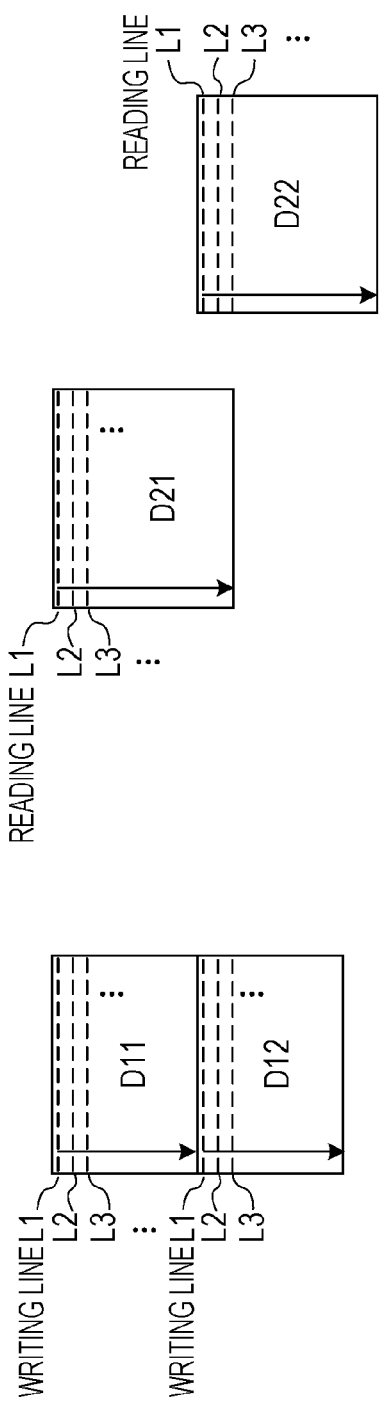
FIG. 10B is a second diagram for explaining writing processing and reading processing by the image processing apparatus of the related art.

With the apparatus configuration in FIG. 1, a case in which the end portion is added during writing will be described with reference to FIG. 9. A writing unit 2-1 adds an end portion d120 that is included in a divided image D12 and is adjacent to a divided image D11 to the divided image D11, and writes the result as a write image D31 on a frame memory unit 3. A writing unit 2-2 writes the divided image D12 as a write image D32 without being processed, on the frame memory unit 3.

A reading unit 4-1 reads the write image D31 as a read image D41 without being processed from the frame memory unit 3. A reading unit 4-2 reads the write image D32 as a read image D42 without being processed from the frame memory unit 3. Even in this case, like the first embodiment, the unnatural feeling of the boundary portion between the plurality of images can be reduced, and the delay time of the image output can be reduced. It is to be noted that, like the description for the modification of the first embodiment, the number of write images and the number of read images are not limited to two, and may be four, six, eight, etc.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-192401 filed Aug. 30, 2010, and No. 2011-123615 filed Jun. 1, 2011, which are hereby incorporated by reference herein in their entirety.

What is claimed is:

1. An image processing apparatus configured to perform image processing for a plurality of images, comprising:
 a writing unit, implemented by a processor, configured to write a first divided image and a second divided image that is adjacent to the first divided image in a predetermined direction, on a memory unit in the predetermined direction on a predetermined-number-of-lines basis, the first and second divided images being obtained by dividing an input image;
 a reading unit, implemented by the processor, configured to add an end portion with a predetermined size that is included in the second divided image and is adjacent to the first divided image, to the first divided image written on the memory unit, read the result as a first read image from the memory unit in the predetermined direction on a predetermined-number-of-lines basis, and read the second divided image written on the memory unit as a second read image from the memory unit in the predetermined direction on a predetermined-number-of-lines basis, the end portion included in the second divided image including a first sub-end portion that is adjacent to the first divided image and a second sub-end portion that is not adjacent to the first divided image;
 an image processing unit, implemented by the processor, configured to perform image processing for the first and second read images read from the memory unit; and
 a cutting unit, implemented by the processor, configured to cut the second sub-end portion from the first read image after the image processing and output the result, and cut the first sub-end portion from the second read image after the image processing and output the result.

2. The image processing apparatus according to claim 1, further comprising a control unit configured to control the reading unit such that the reading unit starts reading of the first and second read images from the memory unit after the writing unit completes writing of the first sub-end portion included in the second divided image on the memory unit and before the writing unit completes writing of the first and second divided images on the memory unit.

3. The image processing apparatus according to claim 2, wherein the control unit controls the reading unit such that the reading unit starts reading of the first and second read images from the memory unit immediately after the writing unit completes writing of the first sub-end portion included in the second divided image on the memory unit.

4. The image processing apparatus according to claim 1, wherein the first sub-end portion and the second sub-end portion have the same size.

5. The image processing apparatus according to claim 1, wherein sizes of the first sub-end portion and the second sub-end portion are determined in accordance with the number of taps of a filter that is used for the image processing.

6. The image processing apparatus according to claim 1, wherein the image processing unit includes
a first image processing large scale integration configured to perform image processing for the first read image, and
a second image processing large scale integration configured to perform image processing for the second read image.

7. A control method of an image processing apparatus configured to perform image processing for a plurality of divided images, the method comprising the steps of:
writing a first divided image and a second divided image that is adjacent to the first divided image in a predetermined direction, on a memory unit in the predetermined direction on a predetermined-number-of-lines basis, the first and second divided images being obtained by dividing an input image;
adding an end portion with a predetermined size that is included in the second divided image and is adjacent to the first divided image, to the first divided image written on the memory unit, reading the result as a first read image from the memory unit in the predetermined direction on a predetermined-number-of-lines basis, and reading the second divided image written on the memory unit as a second read image from the memory unit in the predetermined direction on a predetermined-number-of-lines basis, the end portion included in the second divided image including a first sub-end portion that is adjacent to the first divided image and a second sub-end portion that is not adjacent to the first divided image;
performing image processing for the first and second read images read from the memory unit; and
cutting the second sub-end portion from the first read image after the image processing and outputting the result, and cutting the first sub-end portion from the second read image after the image processing and outputting the result.

8. The control method of the image processing apparatus according to claim 7, wherein the step of reading starts reading of the first and second read images from the memory unit after the step of writing completes writing of the first sub-end portion included in the second divided image on the memory unit and before the step of writing completes writing of the first and second divided images on the memory unit.

9. The control method of the image processing apparatus according to claim 8, wherein the step of reading starts reading of the first and second read images from the memory unit immediately after the step of writing completes writing of the first sub-end portion included in the second divided image on the memory unit.

10. The control method of the image processing apparatus according to claim 7, wherein the first sub-end portion and the second sub-end portion have the same size.

11. The control method of the image processing apparatus according to claim 7, wherein sizes of the first sub-end portion and the second sub-end portion are determined in accordance with the number of taps of a filter that is used for the image processing.

12. The control method of the image processing apparatus according to claim 7, wherein, in the step of performing the image processing, a first image processing large scale integration performs image processing for the first read image, and a second image processing large scale integration performs image processing for the second read image.

13. An image processing apparatus configured to perform image processing for a plurality of images, comprising:
a writing unit, implemented by a processor, configured to write lines of an input image from a p-th line to a q-th line, where q is greater than p, as a first write image, on a memory unit on a predetermined-number-of-lines basis, and write lines of the input image from a (q+1)-th line to a r-th line, where r is greater than (q+1), as a second write image, on the memory unit on a predetermined-number-of-lines basis;
a reading unit, implemented by the processor, configured to add an end portion with a predetermined size that corresponds to lines of the second write image from a 1st line to a z-th line, where z is greater than 1, to the first write image written on the memory unit, read the result as a first read image from the memory unit on a predetermined-number-of-lines basis, and read the second write image written on the memory unit as a second read image from the memory unit on a predetermined-number-of-lines basis, the end portion included in the second write image including a first sub-end portion that is adjacent to the q-th line of the first write image and a second sub-end portion that is not adjacent to the q-th line of the first write image;
an image processing unit, implemented by the processor, configured to perform image processing for the first and second read images read from the memory unit; and
a cutting unit, implemented by the processor, configured to cut the second sub-end portion from the first read image after the image processing and output the result, and cut the first sub-end portion from the second read image after the image processing and output the result.

14. The image processing apparatus according to claim 13, wherein the first sub-end portion and the second sub-end portion have the same size.

15. The image processing apparatus according to claim 13, wherein sizes of the first sub-end portion and the second sub-end portion are determined in accordance with the number of taps of a filter that is used for the image processing.

16. The image processing apparatus according to claim 13, wherein the image processing unit includes
a first image processing large scale integration configured to perform image processing for the first read image, and
a second image processing large scale integration configured to perform image processing for the second read image.

17. A control method of an image processing apparatus configured to perform image processing for a plurality of images, the method comprising the steps of:
writing lines of an input image from a p-th line to a q-th line, where q is greater than p, as a first write image, on a memory unit on a predetermined-number-of-lines basis, and writing lines of the input image from a (q+1)-th line to a r-th line, where r is greater than (q+1), as a second write image, on the memory unit on a predetermined-number-of-lines basis;
adding an end portion with a predetermined size that corresponds to lines of the second write image from a 1st line to a z-th line, where z is greater than 1, to the first write image written on the memory unit, reading the result as a first read image from the memory unit on a predetermined-number-of-lines basis, and reading the second write image written on the memory unit as a second read image from the memory unit on a predetermined-number-of-lines basis, the end portion included in the second write image including a first sub-end portion that is adjacent to the q-th line of the first write image and a second sub-end portion that is not adjacent to the q-th line of the first write image;

performing image processing for the first and second read images read from the memory unit; and cutting the second sub-end portion from the first read image after the image processing and outputting the result, and cutting the first sub-end portion from the second read image after the image processing and outputting the result.

18. The control method of the image processing apparatus according to claim 17, wherein the first sub-end portion and the second sub-end portion have the same size.

19. The control method of the image processing apparatus according to claim 17, wherein sizes of the first sub-end portion and the second sub-end portion are determined in accordance with the number of taps of a filter that is used for the image processing.

20. The control method of the image processing apparatus according to claim 17, wherein, in the step of performing the image processing, a first image processing large scale integration performs image processing for the first read image, and a second image processing large scale integration performs image processing for the second read image.

* * * * *